US011010363B2

(12) United States Patent
Heinle

(10) Patent No.: US 11,010,363 B2
(45) Date of Patent: May 18, 2021

(54) COMPLEMENTING EXISTING TABLES WHILE GROUPING TABLES IN A DISTRIBUTED DATABASE

(71) Applicant: SAP SE, Walldorf (DE)

(72) Inventor: Antje Heinle, Muehlhausen (DE)

(73) Assignee: SAP SE, Walldorf (DE)

(*) Notice: Subject to any disclaimer, the term of this patent is extended or adjusted under 35 U.S.C. 154(b) by 273 days.

(21) Appl. No.: 15/946,159

(22) Filed: Apr. 5, 2018

(65) Prior Publication Data
US 2019/0311053 A1 Oct. 10, 2019

(51) Int. Cl.
G06F 7/00 (2006.01)
G06F 16/22 (2019.01)
G06F 16/28 (2019.01)
G06F 16/2458 (2019.01)
G06F 16/27 (2019.01)

(52) U.S. Cl.
CPC ...... *G06F 16/2282* (2019.01); *G06F 16/2462* (2019.01); *G06F 16/285* (2019.01); *G06F 16/27* (2019.01)

(58) Field of Classification Search
CPC ............. G06F 16/285; G06F 16/24556; G06F 16/2282; G06F 16/27; G06F 16/2462
USPC .......... 707/738, 737, 750, 754, 808
See application file for complete search history.

(56) References Cited

U.S. PATENT DOCUMENTS

| | | |
|---|---|---|
| 5,179,701 A | 1/1993 | Chisholm |
| 5,822,750 A | 10/1998 | Jou |
| 5,924,094 A | 7/1999 | Sutter |
| 6,212,524 B1 | 4/2001 | Weissman |
| 6,226,647 B1 | 5/2001 | Venkatasubramanian |
| 6,886,035 B2 | 4/2005 | Woiff |
| 8,572,091 B1 | 10/2013 | Sivasubramanian |
| 8,768,959 B1 | 7/2014 | Annapragada |
| 9,432,459 B2 | 8/2016 | Sivasubrannanian |
| 9,870,399 B1 | 1/2018 | Sinclair |
| 10,452,632 B1 | 10/2019 | Simmen |
| 2003/0093408 A1 | 5/2003 | Brown |
| 2004/0181522 A1 | 9/2004 | Jardin |
| 2005/0108204 A1 | 5/2005 | Gordon |
| 2005/0222987 A1 | 10/2005 | Vadon |
| 2006/0117026 A1 | 6/2006 | Kaler |
| 2007/0073759 A1 | 3/2007 | El-Sabbagh |
| 2007/0271570 A1 | 11/2007 | Brown |
| 2010/0030801 A1* | 2/2010 | Takayama ............. G06F 16/284 707/802 |
| 2011/0173219 A1 | 7/2011 | Bent |
| 2011/0196857 A1* | 8/2011 | Chen ................ G06F 16/24539 707/714 |
| 2013/0031229 A1 | 1/2013 | Shiga |

(Continued)

*Primary Examiner* — Mohammed R Uddin

(74) *Attorney, Agent, or Firm* — Mintz Levin Cohn Ferris Glovsky and Popeo, P.C.

(57) ABSTRACT

An allocation of tables across a distributed database provides for taking into account existing table groups while also obtaining newly calculated table groups by complementing the existing table groups with regards to the results of the new allocation. Maintaining and protecting one or more types of existing table groups allows for the existing table groups to not be overwritten during allocation of the tables. An identification of tables is used, as well as a determination related to connections between the existing table groups and the newly calculated table groups.

16 Claims, 11 Drawing Sheets

(56) References Cited

U.S. PATENT DOCUMENTS

| | | |
|---|---|---|
| 2013/0080416 A1 | 3/2013 | Meade |
| 2013/0159251 A1 | 6/2013 | Skrenta |
| 2013/0159347 A1 | 6/2013 | Klein |
| 2013/0311421 A1 | 11/2013 | Erdogan |
| 2014/0229473 A1 | 8/2014 | Mehrotra |
| 2014/0279775 A1 | 9/2014 | Chu |
| 2014/0279853 A1 | 9/2014 | Grondin |
| 2014/0289562 A1 | 9/2014 | Ozawa |
| 2014/0358895 A1 | 12/2014 | Liu |
| 2015/0149513 A1* | 5/2015 | Beigel .................. G06F 16/2282 707/809 |
| 2016/0350392 A1 | 12/2016 | Rice |
| 2017/0116315 A1 | 4/2017 | Xiong |
| 2017/0132296 A1 | 5/2017 | Ding |
| 2018/0165331 A1 | 6/2018 | Zhang |
| 2018/0246934 A1 | 8/2018 | Arye |
| 2018/0260421 A1 | 9/2018 | Kumar |
| 2019/0034463 A1 | 1/2019 | Jeong |
| 2019/0102440 A1 | 4/2019 | Tabak |
| 2019/0163795 A1 | 5/2019 | Lai |

* cited by examiner

COMPLEMENTING EXISTING TABLES WHILE GROUPING TABLES IN A DISTRIBUTED DATABASE

FIELD

The present disclosure generally relates to database processing and, more specifically, to the clustering of tables in a distributed database system.

BACKGROUND

Data in a distributed database system is stored across a multitude of physically and/or logically distinct nodes. For example, data in a distributed database system may be stored on different computers. Alternately or additionally, data in a distributed database system may be managed by separate processes. As such, executing a query (e.g., a structured query language (SQL) statement or the like) in a distributed database system may require multiple nodes to perform operations on the data stored at and/or managed by each individual node. Moreover, executing the query may further require a transfer of data (e.g., intermediate query results) between multiple nodes.

SUMMARY

Methods, systems, and articles of manufacture, including computer program products, are provided for clustering tables. In some implementations of the current subject matter, there is provided a system. The system can include at least one processor and at least one memory. The at least one memory can include program code that provides operations when executed by the at least one processor. The operations can include: calculating, based at least on a plurality of queries, a plurality of table groups, each table group comprising a grouping of tables for handling by a respective node in a distributed database; obtaining at least one existing table group; and calculating at least one complemented existing table group, wherein the calculating the at least one complemented existing table group comprises: identifying, for each of the plurality of calculated table groups comprised of at least two tables and having at least one table in the at least one existing table group, the at least one table in the at least one existing table group; determining, for each of the plurality of calculated table groups comprised of at least two tables and having at least one table in the at least one existing table group, if one or more other tables comply with pre-established requirements; assigning, based on the identifying and the determining, a group name and a group type to the identified at least one table and to the one or more other tables that comply with the pre-established requirements; and grouping the tables according to the respective assigned group names and group types.

In some variations, tables that do not comply with the pre-established requirements are not grouped.

In some variations, the group name and the group type assigned to the identified at least one table that is in the at least one existing table group comprises an existing group name and an existing group type of that of the at least one existing table group.

In some variations, the group name and the group type assigned to the one or more other tables that comply with the pre-established requirements comprises an existing group name and a distinguishing group type.

In some variations, the pre-established requirements comprise one or more values indicative of workload, cross-node communication, and/or memory.

In some variations, determining if the one or more other tables comply with pre-established requirements comprises: calculating a weighting value for each of the one or more other tables, the weighting value comprising a ratio of a number of query executions for a particular table over a total number of query executions for a larger subset of tables; and comparing the weighting value to a pre-established weighting value.

In some variations, a pre-established limit is applied for a number of tables to be added to each of the at least one complemented existing table group. In some variations, the pre-established limit is further defined with respect to the pre-established requirements.

In some variations, in response to an overwrite command, a calculated group name and group type is assigned to each table in the calculated plurality of table groups.

In some variations, the at least one complemented existing table group is allocated to a node in the distributed database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
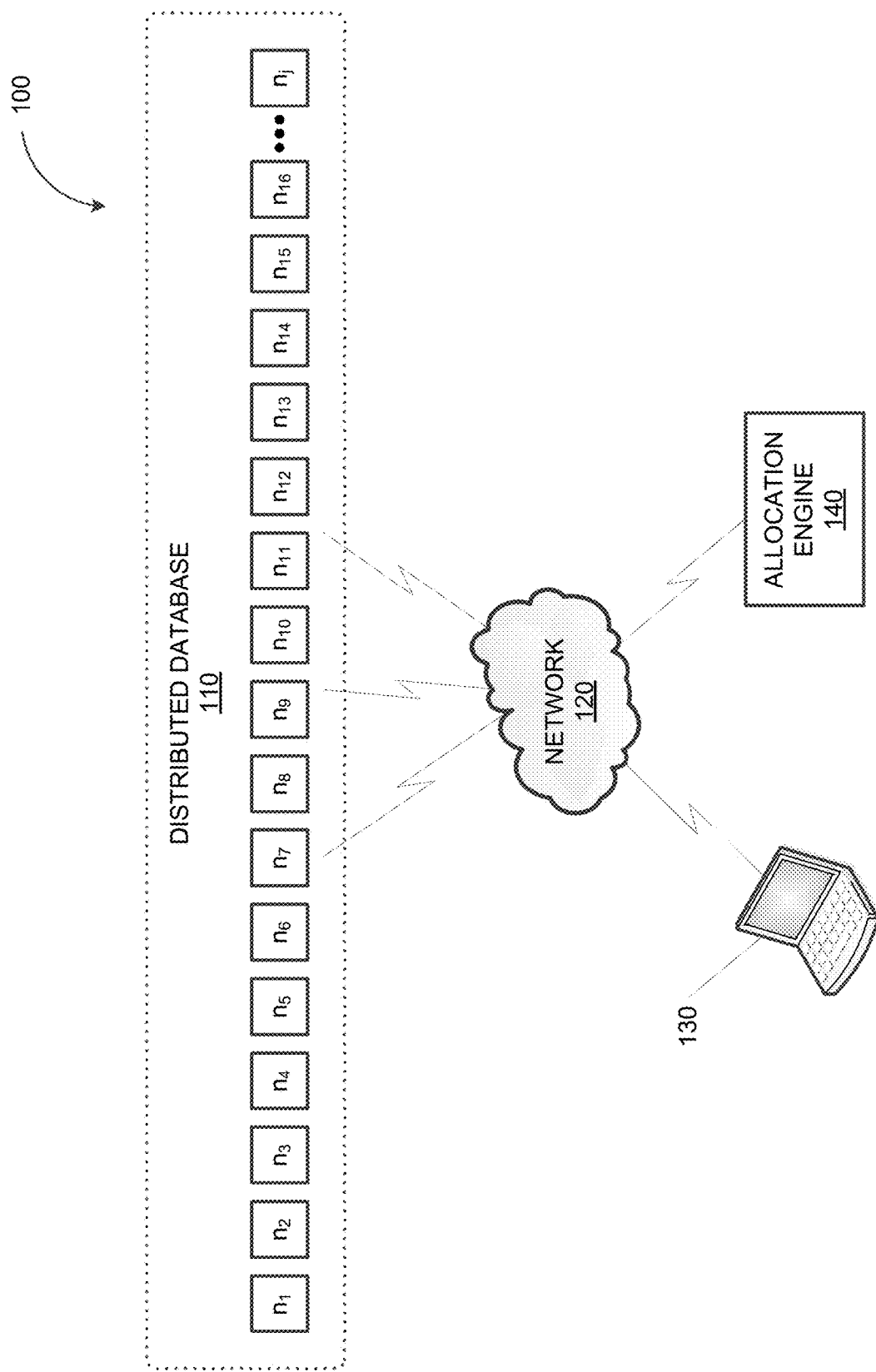
FIG. 1 depicts a network diagram illustrating a network environment consistent with implementations of the current subject matter.

Like labels are used to refer to same or similar items in the drawings.

DETAILED DESCRIPTION

The execution of a query (e.g., a SQL statement or the like) in a distributed database can require a transfer of data (e.g., intermediate query results) between multiple nodes in the distributed database, thereby increasing the network overhead (e.g., bandwidth) associated with the query. Accordingly, the handling (e.g., storage and/or management) of data are typically distributed across various nodes in a manner that minimizes the transfer of data between nodes. For instance, data that is required to respond to different queries may be stored in two or more tables such that these tables are generally used (e.g., accessed) together when responding to various queries. These tables would typically be stored at and/or managed by the same node in an effort to maximize the locality of the data stored at the node. But while maximizing the locality of data can reduce the transfer of data between the nodes in a distributed database, it can also introduce a workload (e.g., central processing unit (CPU) load, query load, memory load, and/or the like) imbalance across the nodes in the distributed database. For example, maximizing data locality may concentrate the storage and/or management of tables to very few nodes in the distributed database. As such, a small number of nodes may be required to execute a disproportionately high number of queries while other nodes in the distributed database remain largely idle.

In some implementations of the current subject matter, an allocation engine can be configured to identify one or more disjoint table sets. The allocation engine can identify the one or more disjoint table sets based on a selection of queries. For instance, the allocation engine can identify the one or more disjoint table set based on a number (e.g., 200,000) of the most recently and/or most frequently used queries (e.g., SQL statements or the like). Each disjoint table set may include one or more tables that are used either individually and/or in combination to respond to at least a portion of the query selection. According to some implementations of the current subject matter, the allocation engine can further determine, for each disjoint table set, one or more key performance indicators (KPIs) including, for example, an execution time and an execution count. The execution time for a disjoint table set may correspond to a length of time (e.g., total, average, minimum, maximum) required to execute various queries using one or more tables from that disjoint table set. Meanwhile, the execution count for a disjoint table set may correspond to a number of times (e.g., total, average, minimum, maximum) each table in the disjoint table set is used in executing various queries.

In some implementations of the current subject matter, the allocation engine can be further configured to split a table set (e.g., a disjoint table set) such that tables in the set are stored at and/or managed by multiple nodes in a distributed database instead of a single node. For instance, the allocation engine can split a table set when one or more KPIs (e.g., execution count, execution time) associated with that table set exceed a threshold value. According to some implementations of the current subject matter, the allocation engine can split a table set into two or more subsets such that the respective KPIs (e.g., execution count, execution time) of each subset are all below a threshold value and/or are substantially the same value. Alternately and/or additionally, the allocation engine can split a table set into two or more subsets such that at least one cross KPI between the two or more subsets is minimized. Minimizing a cross KPI (e.g., execution count, execution time) may include minimizing the KPI arising from queries that use tables from more than one subset. In doing so, the allocation engine can achieve a more balanced workload (e.g., CPU load, query load, memory load) across the nodes in the distributed database system while still minimizing the network overhead (e.g., bandwidth) engendered by a transfer of data between different nodes.

In some implementations of the current subject matter, the allocation engine can split a table set into two or more subsets by identifying tables from the table set that can be split off into a subset, and thus stored at a different node than tables still remaining in the table set. Moving a table from the table set into a subset may decrease one or more KPIs (e.g., execution count, execution time) associated with the table set but may also increase one or more cross KPIs. As such, the allocation engine may be configured to determine one or more KPIs and cross KPIs for the subset of one or more tables, whenever a table from the table set is added to the subset. The allocation engine may be configured to ensure that the one or more KPIs and cross KPIs are kept within threshold values. For example, when adding a table from the table set to the subset, the allocation engine may determine whether adding the table to the subset causes one or more cross KPIs for the subset to exceed a threshold value. That is, the allocation engine may determine whether storing the table at a separate node from other tables in the table set would engender an excessive amount of data transfer between the various nodes. Alternatively and/or additionally, the allocation engine may determine whether the addition of the table to the subset causes one or more KPIs for the subset to exceed a minimum and/or a maximum threshold value. Here, the allocation engine is configured to ensure that the handling (e.g., storage and/or management) of the tables are distributed across the nodes such that no node in the distributed database is subject to an excessively high or low workload (e.g., CPU load, query load, memory load).

FIG. 1 depicts a network diagram illustrating a network environment 100 consistent with implementations of the current subject matter. Referring to FIG. 1, a distributed database 110 can include a j number of nodes (e.g., $n_1$ through $n_j$). The nodes $n_1$ through $n_j$ can be communicatively coupled via a wired and/or wireless network 120. The wired and/or wireless network 120 can be a wide area network (WAN), a local area network (LAN), and/or the Internet. The distributed database system 100 can include any number of nodes without departing from the scope of the present disclosure.

In some implementations of the current subject matter, a client 130 can communicate with the distributed database 110 via the wired and/or wireless network 120. For instance, the client 130 can submit a query (e.g., a SQL statement or the like) to the distributed database 110. Data in the distributed database 110 can be stored and/or managed across different nodes (e.g., one or more of the nodes $n_1$ through $n_j$). For instance, one or more of the nodes $n_1$ through $n_j$ may each store at least one table. Meanwhile, executing the query from the client 130 may require data from multiple tables. As such, fulfilling the query from the client 130 can require the use of tables stored at and/or managed by one or more of the nodes $n_1$ through $n_j$. Thus, according to some implementations of the current subject matter, the storage and/or management of different tables can be allocated across the nodes $n_1$ through $n_j$ in a manner that balances the workload (e.g., CPU load, query load, memory load) across the nodes $n_1$ through $n_j$ and/or minimizes the amount of data transfer (e.g., network overhead) amongst the nodes $n_1$ through $n_j$.

Referring again to FIG. 1, an allocation engine 140 can be communicatively coupled with the distributed database 110. In some implementations of the current subject matter, the allocation engine 140 can be configured to identify one or more disjoint table sets that each include one or more tables that are used individually and/or in combination to respond to at least a portion of a selection of the most recently and/or frequently used queries at the distributed database 110. Furthermore, the allocation engine 140 can also determine, for each disjoint table set, one or more KPIs including, for example, an execution time and an execution count.

In some implementations of the current subject matter, the allocation engine 140 can be further configured to split a table set (e.g., a disjoint table set) into two or more subsets that are to be stored at and/or managed by different nodes in the distributed database 110. For example, the allocation engine 140 can split a table set when at least one KPI (e.g., execution time, execution count) associated with that table set exceed a threshold value. The allocation engine 140 can split the table set such that the respective KPIs (e.g., execution count, execution time) of each subset are all below a threshold value and/or are substantially the same value. Alternately and/or additionally, the allocation engine can split a table set into two or more subsets such that at least one cross KPI between the two or more subsets is minimized.

In some implementations of the current subject matter, the functionalities of the allocation engine 140 can be accessed as a remote (e.g., cloud or the like) service via the network 120. For instance, the allocation engine 140 can be deployed at a separate remote platform and/or at the client device 130 as computer software and/or dedicated circuitry (e.g., application specific integrated circuits (ASICs)). Alternately and/or additionally, the allocation engine 140 can also be deployed at the distributed database 110. For example, the allocation engine 140 can be implemented as computer software and/or dedicated circuitry (e.g., ASICs) at one or more of the nodes $n_1$ through $n_j$.

For clarity and conciseness, data in the distributed system 100 is described as having a columnar format (e.g., tables). However, it should be appreciated that data in the distributed system 100 can be organized to have a different and/or additional structural format without departing from the scope of the present disclosure.

Figure 2:
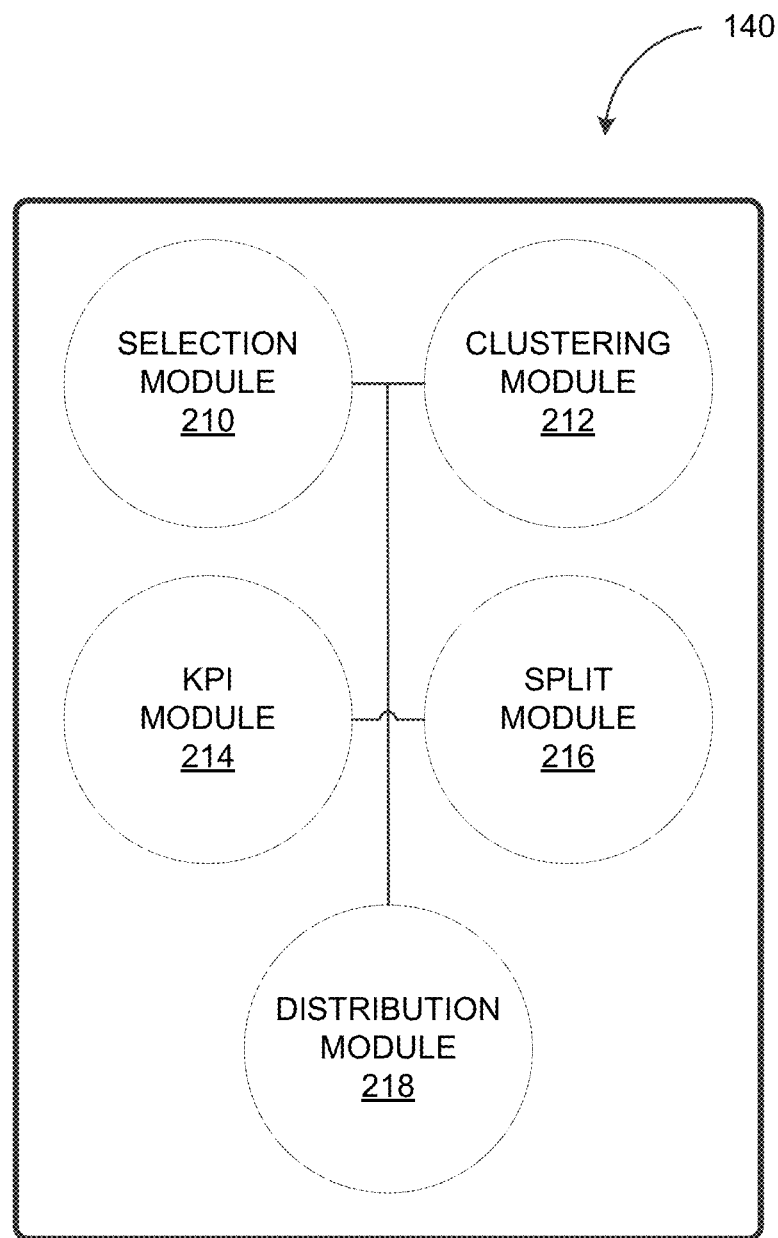
FIG. 2 depicts a block diagram illustrating an allocation engine consistent with implementations of the current subject matter.

FIG. 2 depicts a block diagram illustrating the allocation engine 140 consistent with implementations of the current subject matter. Referring to FIGS. 1-2, the allocation engine 140 can include a selection module 210, a clustering module 212, a KPI module 214, a split module 216, and a distribution module 218. It should be appreciated that the allocation engine 140 can include additional and/or different modules without departing from the scope of the present disclosure.

In some implementations of the current subject matter, the selection module 210 can be configured to generate a selection of queries based on the queries that are received at the distributed database 110. For example, the selection module 210 can be configured to generate a query selection that includes a number (e.g., 200,000) of the most recently used queries at the distributed database 110. Alternately and/or additionally, the selection module 210 can be configured to generate a query selection that includes a number (e.g., 200,000) of the most frequently used queries at the distributed database 110. It should be appreciated that the selection module 210 can generate the query selection based on different and/or additional criteria without departing from the scope of the present disclosure.

In some implementations of the current subject matter, the clustering module 212 can be configured to identify one or more disjoint table sets. For example, the clustering module 212 can identify the disjoint table sets based on the query selection (e.g., most recently and/or frequently used queries) generated by the selection module 210. Each of the one or more disjoint table sets can include tables that are used either individually and/or in combination to respond to at least a portion of the query selection (e.g., generated by the selection module 210).

In some implementations of the current subject matter, the KPI module 214 can be configured to determine one or more KPIs for each disjoint table set identified by the clustering module 212. For instance, the KPI module 214 can determine an execution count for each disjoint table set identified by the clustering module 212. The execution count for a table set may correspond to a total, average, maximum, and/or minimum number of times each table in the table set is used by the queries associated with that table set. Alternately and/or additionally, the KPI module 214 can determine an execution time for each disjoint table set identified by the clustering module 212. The execution time for a table set may correspond to a total, average, maximum, and/or minimum amount of time required for executing the queries associated with that table set.

In some implementations of the current subject matter, the split module 216 can be configured to split a table set into two or more subsets. The split module 216 can be configured to split a table set in a manner that balances the workload (e.g., CPU load, query load, memory load) across the nodes $n_1$ through $n_j$. Alternately and/or additionally, the split module 216 can split the table set in a manner that minimizes the amount of data transfer (e.g., network overhead) amongst the nodes $n_1$ through $n_j$.

For instance, the split module 216 can split, into two or more subsets, at least one disjoint table set identified by the clustering module 212. According to some implementations of the current subject matter, the split module 216 can split a table set when at least one KPI (e.g., execution count, execution time) associated with the table set (e.g., as determined by the KPI module 214) exceeds a threshold value. The split module 216 can split a table set into two or more subsets such that that the respective KPIs (e.g., execution count, execution time) of each subset are all below a threshold value and/or are substantially the same value. Alternately and/or additionally, the allocation engine can split a table set into two or more subsets such that at least one cross KPI between the two or more subsets is minimized.

In some implementations of the current subject matter, the distribution module 218 can be configured to distribute tables (e.g., of data) for storage at and/or management by one or more of the nodes $n_1$ through $n_j$. The distribution module 218 can be configured to distribute the tables based at least on the splits determined by the split module 216. For example, the distribution module 218 may allocate, based at least on a split determined by the split module 216, the storage and/or management of a disjoint table set to two or more of the $n_1$ through $n_j$ in the distributed database 110. As such, one subset from the disjoint table set may be stored at and/or managed by one node while another subset from the disjoint table set may be stored at and/or managed by a different node. Distributing the storage and/or management of tables in this manner may balance the workload (e.g., CPU load, query load, memory load) across the nodes $n_1$ through $n_j$ and/or minimize the amount of data transfer (e.g., network overhead) amongst the nodes $n_1$ through $n_j$.

Figure 3A:
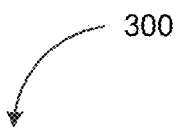
FIG. 3A depicts a table illustrating a plurality of query table pairs consistent with implementations of the current subject matter.

FIG. 3A depicts a table 300 illustrating a plurality of query table pairs consistent with implementations of the current subject matter. Referring to FIG. 1-3, the plurality of query table pairs shown in the table 300 can correspond to a selection of queries (e.g., most recently used and/or frequently used queries) generated by the selection module 210. For instance, the table 300 can include a number of the most recently and/or frequently used queries (e.g., SQL statements or the like) at the distributed database 110. As shown in FIG. 3A, the table 300 can include a selection of queries that includes, for example, a first query 310, a second query 312, a third query 314, a fourth query 316, a fifth query 318, a sixth query 320, and a seventh query 322.

In some implementations of the current subject matter, each query can be associated with an identifier (e.g., a unique integer number). For instance, the first query 310 can be associated with an identifier (e.g., the number "1") while the second query 312 can be associated with a different identifier (e.g., the number "2"). Furthermore, each query can be associated with one or more tables that include data required for executing the query. For example, the first query 310 may be a JOIN operation that combines data from Table A and Table B. Thus, executing the first query 310 can require data from Table A and Table B. Meanwhile, executing the second query 320 can require data from Table A, Table B, and Table C.

Referring again to FIG. 3A, each query in the table 300 can further be associated with one or more KPIs. For instance, the first query 310 can be associated with an execution count (e.g., 50,000) corresponding to a number of times Table A is used in executing the first query 310 and a separate execution count (e.g., 50,000) corresponding to a number of times Table B is used in executing the first query 310. Alternately and/or additionally, the first query 310 can be associated with an execution time (e.g., 10 seconds) corresponding to a length of time required to execute the first query 310. Similarly, the second query 312 can also be associated with execution counts corresponding to a respective number of times Table A, Table B, and Table C are used in executing the second query 312. The second query 312 can further be associated with an execution time corresponding to a length of time required to execute the second query 312.

In some implementations of the current subject matter, execution count may be a measure of a number of times a table (e.g., Table A, Table B, Table C) is used in executing queries since the last system restart (e.g., of the distributed database 110). When two or more tables are used in executing the same query, the respective execution counts of the tables can be incremented by a same amount. Meanwhile, execution time may be a measure of a length of time required to execute queries since the last restart of the system (e.g., of the distributed database 110). In some implementations of the current subject matter, the execution time of a query may provide an indication of the complexity of the query. Because the execution time for executing the same query may vary, the execution time associated with a query may be an average execution time for executing that query.

The clustering module 212 can identify one or more disjoint table sets based at least on the table 300. According to some implementations of the current subject matter, the query table pairs included in the table 300 can be sorted prior to being used by the clustering module 212 to identify one or more disjoint table sets. For example, the query table pairs included in the table 300 can be sorted based on one or more KPIs. As shown in FIG. 3A, the query table pairs included in the table 300 are sorted based on the respective execution counts associated with each query. Alternately and/or additionally, the query table pairs included in the table 300 can be sorted based on the respective execution times for each query.

Figure 3B:
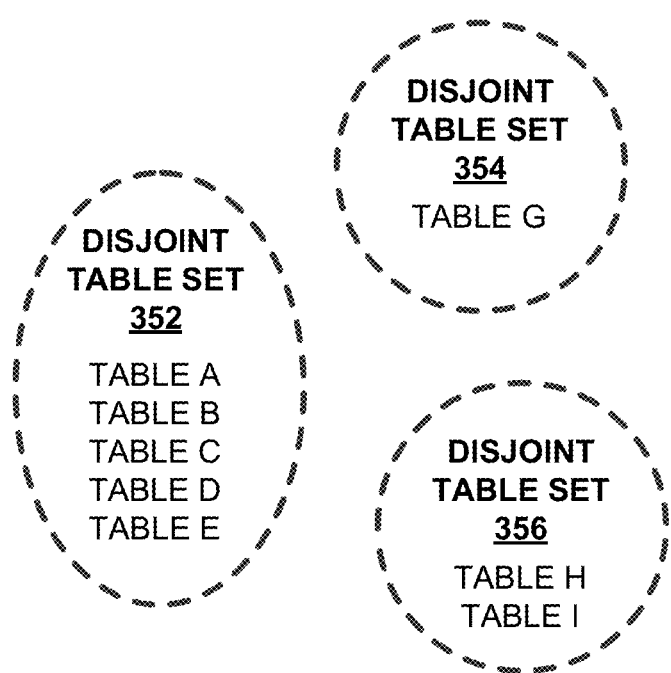
FIG. 3B depicts a plurality of disjoint table sets consistent with implementations of the current subject matter.
Figure 4A:
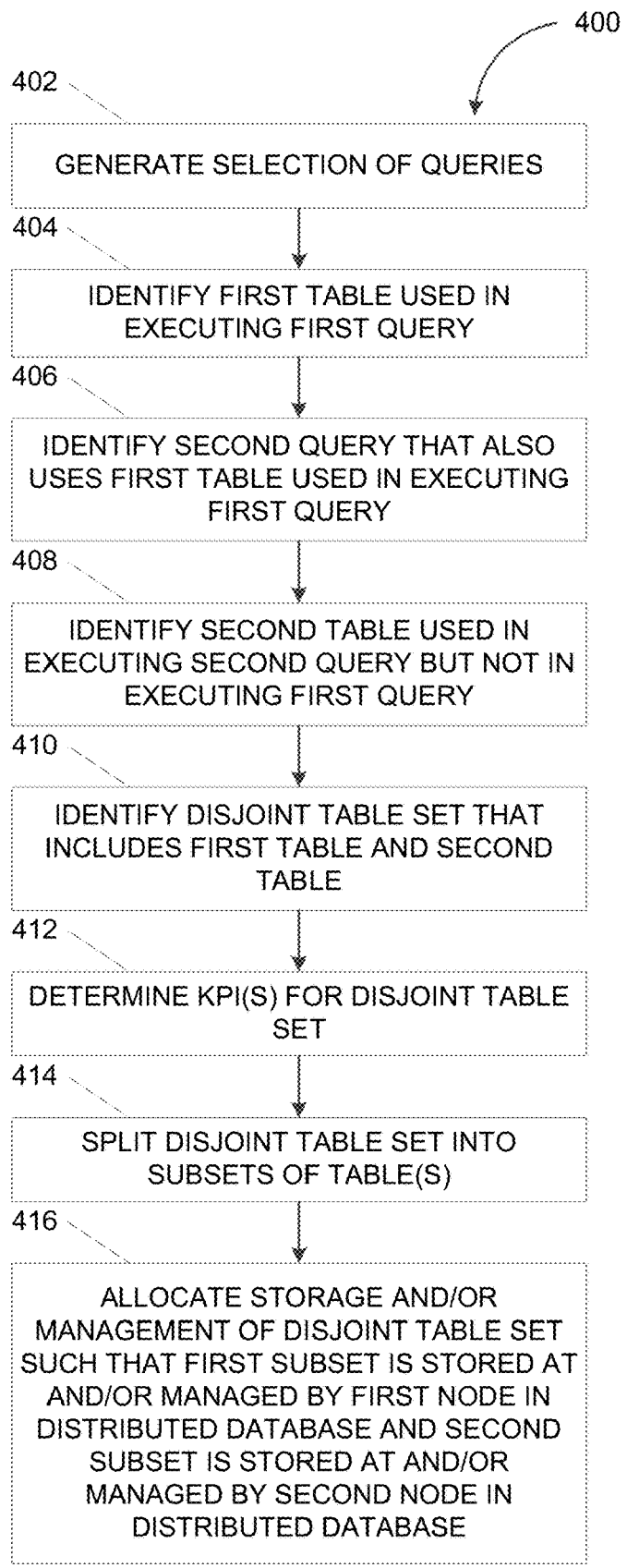
FIG. 4A depicts a flowchart illustrating a process for identifying a disjoint table set consistent with implementations of the current subject matter.

FIG. 4A depicts a flowchart illustrating a process 400 for identifying a disjoint table set consistent with implementations of the current subject matter. Referring to FIGS. 1-4, the process 400 can be performed by the allocation engine 140.

The allocation engine 140 can generate a selection of queries (402). For example, the allocation engine 140 (e.g., the selection module 210) can generate a query selection having a number (e.g., 200,000) of the most recently and/or frequently used queries (e.g., SQL statements or the like) at the distributed database 110. In some implementations of the current subject matter, the query selection can be sorted based on one or more KPIs associated with each query. For instance, the queries in the query selection can be sorted based on the execution count and/or execution time associated with each query.

The allocation engine 140 can identify a first table that is used in executing a first query (404). For example, the allocation engine 140 (e.g., the clustering module 212) can identify Table A and Table B as being used by the first query 310. That is, Table A and Table B can both include data that is used in executing the first query 310.

The allocation engine 140 can identify a second query that also uses the first table used in executing the first query (406). For example, the second query 312, the third query 314, the fourth query 316, and the seventh query 322 all require data from Table A and/or Table B. As such, the allocation engine 140 (e.g., the clustering module 212) can identify the second query 312, the third query 314, the fourth query 316, and the seventh query 322 as also using Table A and/or Table B.

The allocation engine 140 can identify a second table that is used in executing the second query but not in executing the first query (408). For instance, executing the second query 312 can require data from Table A and Table B, which are also used by the first query 310. However, executing the second query 312 can also require data from Table C, which is not used by the first query 310. Thus, the allocation engine 140 (e.g., the clustering module 212) can identify Table C as table that is used by the second query 312 but not the first query 310. Meanwhile, executing the third query 314 can require data from Table A and Table D while executing the fourth query 316 can require data from Table B and Table E. As such, the allocation engine 140 (e.g., the clustering module 212) can further identify Table D as being used by the third query 314 but not the first query 310. Similarly, the allocation engine 140 (e.g., the clustering module 212) can identify Table E as being used by the fourth query 316 but not the first query 310.

The allocation engine 140 can identify a disjoint table set that includes the first table and the second table (410). For example, the allocation engine 140 can identify one disjoint table set that includes Table A, Table B, Table C, Table D, and Table E. This disjoint table set includes tables that are used individually and/or in combination in executing at least a portion of the query selection shown in table 300.

In some implementations of the current subject matter, operations 404 through 410 can be repeated for any remaining queries in the selection of queries generated at operation 402. For example, the allocation engine 140 (e.g., the clustering module 212) can identify Table G as being used by the fifth query 318. As Table G is not used by any other queries in the query selection, the allocation engine 140 can identify another disjoint table set that includes Table G. Similarly, the allocation engine 140 can identify Table H and Table I as being used by the sixth query 320. The allocation engine 140 can identify a disjoint table set that includes Table H and Table I because neither Table H nor Table I are used by any other queries in the query selection.

FIG. 3B depicts a plurality of disjoint table sets consistent with implementations of the current subject matter. Referring to FIGS. 3A-B, the allocation engine 140 can identify, based at least on the Table 300, a plurality of disjoint table sets that includes, for example, a first disjoint table set 352, a second disjoint table set 354, and a third disjoint table set 356. A disjoint table set is disjoint from other disjoint table sets because the disjoint table set includes all the tables that are required for executing the queries associated that disjoint table set. Thus, all the queries associated with one disjoint table set can be executed without requiring data from tables included in any other disjoint table set.

As shown in FIG. 3B, the first disjoint table set 352 can include Table A, Table B, Table C, Table D, and Table E. One or more of Table A, Table B, Table C, Table D, and Table E are used by the first query 310, the second query 312, the third query 314, the fourth query 316, and the seventh query 322. All the data required for executing the first query 310, the second query 312, the third query 314, the fourth query 316, and the seventh query 322 are in the tables included in the first disjoint table set 352. Thus, executing the first query 310, the second query 312, the third query 314, the fourth query 316, and the seventh query 322 would not require data in tables included in the second disjoint table set 354 or the third disjoint table set 356. Other queries in the query selection (e.g., the fifth query 318 and the sixth query 320) also would not require data from the tables in the first disjoint table set 352. Meanwhile, the second disjoint table set 354 includes Table G, which is used only by the fifth query 318 and not by any of the other queries in the query selection. Similarly, the third disjoint table 356 includes Table H and Table I, which are used only by the sixth query 320.

The allocation engine 140 can determine at least one KPI for the disjoint table set (412). For example, the allocation engine 140 (e.g., the KPI module 214) can determine a total, average, maximum, and/or minimum execution count for the queries associated with the first disjoint table set 352, the second disjoint table set 354, and/or the third disjoint table set 356. Alternately and/or additionally, the allocation engine 140 can determine a total, average, maximum, and/or minimum execution time for the queries associated with the first disjoint table set 352, the second disjoint table set 354, and/or the third disjoint table set 356.

The allocation engine 140 can split the disjoint table set into a first subset and a second subset of one or more tables (414). For instance, the allocation engine 140 (e.g., the split module 216) can split the first disjoint table set 352, when at least one KPI (e.g., execution count, execution time, and/or the like) associated with the first disjoint table set 352 exceeds a threshold value. The allocation engine 140 can split the first disjoint table 352 such that the first subset of one or more tables is to be stored at and/or managed by one node in the distributed database 110 while the second subset of one or more tables is to be stored at and/or managed by a different node in the distributed database system 110.

According to some implementations of the current subject matter, the allocation engine 140 can split the first disjoint table set 352 in a manner that balances the workload (e.g., CPU load, query load, memory load) across the nodes $n_1$ through $n_j$ in the distributed database 110. Alternately and/or additionally, the allocation engine 140 can split the first disjoint table set 352 in a manner that minimizes the amount of data transfer (e.g., network overhead) amongst the nodes $n_1$ through $n_j$ in the distributed database 110.

The allocation engine 140 can allocate the storage and/or management of the disjoint table set such that the first subset of one or more tables is stored at and/or managed by a first node in a distributed database system and the second subset of one or more tables is stored at and/or managed by a second node in the distributed database system (416). For example, the allocation engine 140 can allocate the first subset of one or more tables such that the first subset of one or more tables is stored at and/or managed by one of the nodes (e.g., $n_1$ through $n_j$) in the distributed database 110. The allocation engine 140 can further allocate the second subset of one or more tables such that the second subset of one or more tables is stored at and/or managed by a different one of the nodes (e.g., $n_1$ through $n_j$) in the distributed database 110.

Figure 4B:
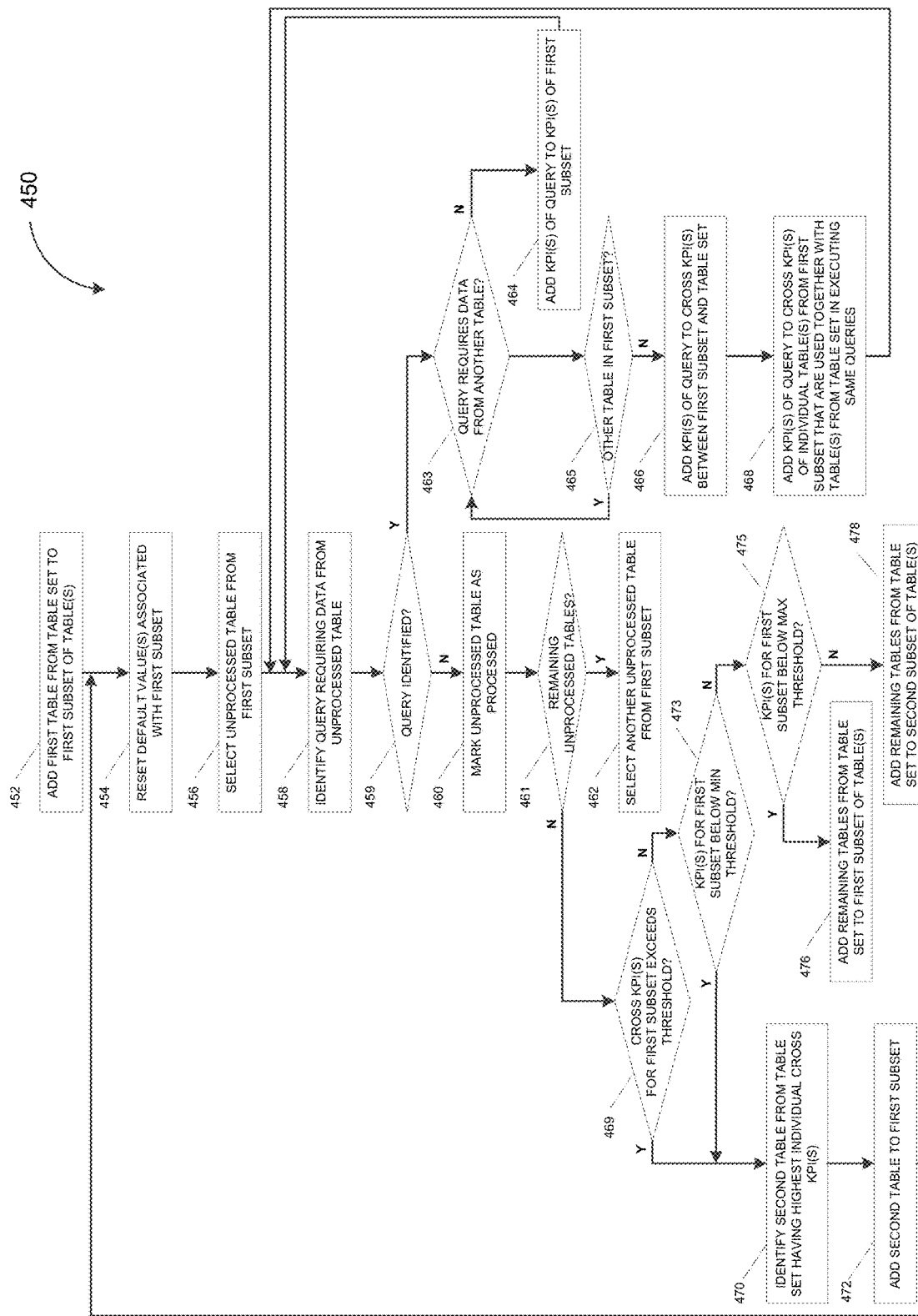
FIG. 4B depicts a flowchart illustrating a process for splitting a table set consistent with implementations of the current subject matter.

FIG. 4B depicts a flowchart illustrating a process 450 for splitting a table set consistent with implementations of the current subject matter. Referring to FIGS. 1-4B, the process 450 can be performed by the allocation engine 140 and can implement operation 414 of the process 400. It should be appreciated that the process 450 is performed to split a table set, when the table set is determined to have more than one table.

The allocation engine 140 can add a first table from a table set to a first subset of one or more tables (452). In some implementations of the current subject matter, the allocation engine 140 (e.g., the split module 216) can determine to split a disjoint table set (e.g., identified by the clustering module 212), when one or more of the disjoint table set's KPIs (e.g., execution count) exceed a threshold value. For instance, the allocation engine 140 can determine to split a disjoint table set when the KPI of the disjoint table set exceeds a certain percentage (e.g., 40%) of the overall KPI for a selection of the most recently and/or frequently used queries at the distributed database 110 (e.g., generated by the selection module 210). The allocation engine 140 can split the disjoint table set by identifying, in the disjoint table set, one or more tables to place in a subset of the disjoint table set.

As one example, the allocation engine 140 can select Table A from the first disjoint table set 352. The allocation engine 140 can further add Table A to a first subset of the first disjoint table set 352. According to some implementations of the current subject matter, the allocation engine 140 can be configured to select, from the table set, a table having a highest KPI such as, for example, execution count. Thus, the allocation engine 140 can add Table A to the first subset, when the allocation engine 140 determines that Table A has the highest execution count relative to other tables (e.g., Tables B, C, D, and E) in the first disjoint table set 352.

In some implementations of the current subject matter, splitting Table A from the first disjoint table set 352 to form the first subset may decrease one or more KPI (e.g., execution count) associated with the first disjoint table set 352. That is, removing Table A from the first disjoint table set 352 can decrease the workload (e.g., CPU load, query load, memory load) at the node storing and/or managing the remaining tables in the first disjoint table set 352. However, splitting Table A from the first disjoint table set 352 to form the first subset can also increase one or more cross KPIs indicative of an increase in an amount of data transfer between the node storing and/or managing the first subset and the node storing and/or managing the remaining tables in the first disjoint table set 352. Thus, according to implementations of the current subject matter, the allocation engine 140 is configured to split the first disjoint table set 352 into two or more subsets in a manner that balances the workload at the nodes storing and/or managing each subset while minimizing the amount of data transfer between these nodes.

The allocation engine 140 can reset one or more default values associated with the first subset (454). In some implementations of the current subject matter, the allocation engine 140 (e.g., the split module 216) can mark the first table as unprocessed. The allocation engine 140 can further set one or more KPIs to a null or zero value. For instance, the allocation engine 140 can set an execution count for the first subset to a null or zero value. The execution count for the first subset can correspond to a number of times tables in the first subset are used in executing one or more queries that only require data from tables in the first subset. Alternately and/or additionally, the allocation engine 140 can further set, to a null or zero value, a cross execution count between the first subset and the remaining tables in the table set. This cross execution count can correspond to a number of times the tables in the first subset and the remaining tables in the table set are used in executing one or more queries. In order to avoid an overlap in execution count and cross execution count, it should be appreciated that the execution count for the first subset specifically excludes execution count arising from queries that require data from both the tables in the first subset and the remaining tables in the table set.

The allocation engine 140 can select an unprocessed table from the first subset (456) and identify a query that requires data from the unprocessed table (458). For instance, the allocation engine 140 (e.g., the split module 216) can select Table A from the first subset of one or more tables and identify a query that requires data from Table A. If the allocation engine 140 is not able to successfully identify a query that requires data from the unprocessed table (459-N), the allocation engine 140 can mark the unprocessed table as processed (460). For example, if the allocation engine 140 cannot identify a query that requires data from Table A, then the allocation engine 140 can mark Table A as processed and continue processing the remaining tables in the first subset. According to some implementations of the current subject matter, the allocation engine 140 can determine whether there are any remaining unprocessed tables in the first subset (461). If the allocation engine 140 determines that there are remaining unprocessed tables in the first subset (461-Y), the allocation engine 140 can select another unprocessed table from the first subset (462) and the process 450 can continue at operation 458.

If the allocation engine 140 is able to successfully identify a query that requires data from the unprocessed table (459-Y), the allocation engine 140 can determine whether the query requires data from another table (463). For example, the allocation engine 140 (e.g., the split module 216) may determine that the first query 310 requires data from Table A. As such, the allocation engine 140 can determine whether the first query 310 requires data from any other tables. In doing so, the allocation engine 140 can identify other tables with data required by the first query 310 (e.g., Table B).

In some implementations of the current subject matter, the allocation engine 140 may determine that the query does not require data from another table (463-N). For instance, the seventh query 322 requires only data from Table A. In this scenario, the allocation engine 140 can add one or more KPIs associated with the query to corresponding KPIs of the first subset (464) and the process 450 can continue at 458. For example, the KPI (e.g., execution count) associated with seventh query 322 may be added to the KPI (e.g., execution count) of the first subset. The process 450 can continue at operation 458 where the allocation engine 140 can identify another query (e.g., the second query 312, the third query 314) that requires data from the unprocessed table.

Alternately and/or additionally, if the allocation engine 140 determines that the query requires data from another table (463-Y), the allocation engine 140 can further determine whether the other table is in the first subset (465). In some implementations of the current subject matter, the tables having data required by the first query 310 may be in the first subgroup or in the table set. Thus, to properly increment the KPIs (e.g., execution count) associated with the first subgroup and the cross KPI (e.g., execution count) between the first subgroup and the remaining tables in the table set, the allocation engine 140 (e.g., the split module 216) can determine which tables are in the first subgroup and which tables are still in the table set. For example, the allocation engine 140 can determine that in addition to Table A, the first query 310 also requires data from Table B. As such, the allocation engine 140 can determine whether Table B is in the first subgroup or still in the table set (e.g., the first disjoint table set 352).

If the allocation engine 140 determines that the other table is in the first subset (465-Y), the process 450 can continue at operation 463. For instance, if the allocation engine 140 (e.g., the split module 216) determines that Table B is already in the first subset, the allocation engine 140 can determine whether the first query 310 requires data from additional tables.

By contrast, if the allocation engine 140 determines that the other table is not in the first subset (465-N), the allocation engine 140 can add one or more KPIs associated with the query to the corresponding cross KPIs of the first subset (466). The allocation engine 140 can further add one or more KPIs associated with the query to the corresponding cross KPIs associated with individual tables from the first subset that are used together with tables from the table set in executing the same queries (468).

As noted above, the KPIs (e.g., execution count) of a query can be added to either the corresponding KPIs of a subset or the corresponding cross KPIs of the subset. The cross KPIs of the first subset may correspond to a number of times tables from both the first subset and remaining tables in the table set are used in executing one or more of the same queries. Thus, if the allocation engine 140 (e.g., the split module 216) determines that Table B is not already in the first subset, the KPIs (e.g., execution count) associated with the first query 310 may be added to the cross KPIs of the first subset instead of being added to the KPIs of the first subset. This increase to the cross KPI of the first subset reflects an increase in an amount of data transfer between the first subset and other tables in the table set, which is necessitated by having two or more tables required in executing the same query stored at and/or managed by different nodes in the distributed database 110. However, the KPIs of the first subset and the table set are not incremented in this scenario because the executing the query generally engenders the same workload increase at each of the nodes storing and/or managing the first subset and the table set In some implementations of the current subject matter, the allocation engine 140 may further keep track of the individual cross KPIs associated with Table B. This individual cross KPI may account for a number of times Table B is used together with another table in the first subset in executing one or more queries. For instance, the individual cross execution count of Table B may be incremented with the execution count associated with the first query 310 if Table A is part of the first subset and Table B is still a part the first disjoint group 352. The individual cross execution count for Table B would not incremented with the execution count of the first query 310 if both Table A and Table B are included in the first subset. Tracking the individual cross KPIs of a table may enable the allocation engine 140 to identify which tables split across different subsets of tables should be recombined into the same subgroup to reduce cross KPIs between subsets of tables (e.g., corresponding to the amount of data transfer between nodes storing and/or managing the different subsets of tables). Once the allocation engine 140 increments the cross KPIs of the first subset and the individual cross KPIs of the tables, the process 450 can continue at operation 458 where the allocation engine 140 attempts to identify another query that requires data from Table A.

When the allocation engine 140 determines that there are no remaining unprocessed tables in the first subset (461-N), the allocation engine 140 can determine whether one or more cross KPIs for the first subset exceed a threshold value (469). For example, the allocation engine 140 can determine whether one or more cross KPIs for the first subset exceeds a certain percentage (e.g., 20%) of the overall KPI for all queries executed using the first subset.

If the allocation engine 140 determines that one or more cross KPIs for the first subset exceeds a threshold value (469-Y), the allocation engine 140 can identify a second table from the table set having a highest individual cross KPI (470). The allocation engine 140 can further add the second table to the first subset (472) and the process 450 can continue at operation 454. For example, when the allocation engine 140 (e.g., the split module 216) determines that the cross KPI for the first subset exceeds a certain percentage (e.g., 20%) of the overall KPI for all queries (e.g., executed using the first subset), the allocation engine 140 can identify another table (e.g., Table B) from the first disjoint table set 352. The allocation engine 140 can identify Table B based on its individual cross KPI, which is updated (e.g., in operation 468) whenever Table B is used together with a table in a different subset (e.g., Table A). It should be appreciated that moving a table with the highest individual cross KPI (e.g., Table B) to the first subset may not necessarily decrease the cross KPI for the first subset such that the cross KPI for the first subset is below the threshold value (e.g., 20% of overall KPI). For instance, moving Table B to the first subset may increase the cross KPI for the first subset, if Table B is used with one or more tables (e.g., Table C, Table E) that are still in the first disjoint table set 352. Furthermore, moving another table into the first subset also increases the KPI of the first subset. Thus, the allocation engine 140 may be configured to recalculate the KPIs and the cross KPIs for the first subset by continuing the process 450 at operation 454.

Alternately and/or additionally, if the allocation engine 140 determines that one or more cross KPIs for the first subset does not exceed a threshold value (469-N), the allocation engine 140 can determine whether one or more KPIs for the first subset is below a minimum threshold value (473). If the allocation engine 140 determines that one or more KPIs for the first subset is below a minimum threshold value (473-Y), the allocation engine 140 can identify a second table from the table set having one or more highest individual cross KPIs (470) and add the second table to the first subset (472). In some implementations of the current subject matter, the allocation engine 140 may be configured to split the first disjoint table set 352 such that the workload (e.g., CPU load, query load, memory load) at each node storing and/or managing one or more tables is between a minimum threshold value (e.g., 15% of the overall KPI for all queries executed using the first subset) and a maximum threshold value (e.g., 65% of the overall KPI for all queries executed using the first subset). Maintaining the workload distribution in this manner ensures that no node is subject to too high or too low of a workload (e.g., CPU load, query load, memory load). Thus, if the allocation engine 140 determines that one or more KPIs for the first subset are below a minimum threshold value, the allocation engine 140 may add additional tables (e.g., Table C) to the first subset such that the node storing and/or managing the first subset is not overly idle. The process 450 can then continue at operation 454 as the allocation engine 140 recalculates the KPIs and the cross KPIs for the first subset.

If the allocation engine determines that one or more KPIs for the first subset are not below a minimum threshold value (473-N), the allocation engine 140 can determine if one or more KPIs for the first subset are below a maximum threshold value (475). For example, the allocation engine 140 may determine that one or more KPIs for the first subset exceed the minimum threshold value (e.g., 15% of the overall KPI for all queries executed using the first subset). In this scenario, the allocation engine 140 can determine that the node storing and/or managing the first subset is not subject to an excessively low workload. However, the node storing and/or managing the first subset may still be subject to an excessively high workload. As such, the allocation engine 140 may compare one or more KPIs for the first subset relative to a maximum threshold value, which may be a percentage (e.g., 65%) of the overall KPI for all queries executed using the first subset.

The allocation engine 140 may determine that one or more KPIs for the first subset are below the maximum threshold value (475-Y). In this scenario, the node storing and/or managing the first subset is still able to accommodate additional tables. As such, the allocation engine 140 may add any remaining tables from the table set to the first subset of one or more tables (476). For instance, the allocation engine 140 (e.g., the split module 216) may add Table C, Table D, and/or Table E from the first disjoint table set 352 to the first subset. Alternately and/or additionally, the allocation engine 140 may determine that one or more KPIs for the first subset are not below the maximum threshold value (475-N). In this scenario, the node storing and/or managing the first subset may already be subject to high workload (e.g., CPU load, query load, memory load). Thus, the allocation engine 140 may add any remaining tables from the table set to a second subset of one or more tables (476). For instance, instead of the first subset, the allocation engine 140 may add Table C, Table D, and/or Table E to another subset of one or more tables because the node storing and/or managing the first subset is already being subject to a large workload and cannot accommodate additional tables.

In accordance with implementations of the current subject matter, in addition to the subsets of tables that are allocated across the nodes $n_1$ through $n_j$ in a manner that balances the workload across the nodes $n_1$ through $n_j$ and/or minimizes the amount of data transfer amongst the nodes $n_1$ through $n_j$, customer-specific and/or customer-designed table groups or subsets of tables may exist and/or may be created for use in the network environment 100. For example, a customer may create a particular table group based on a new application or past experiences. A customer-designed table group may include tables related to a particular category or categories, or tables that are expected to be often used together. Or, as another example, a customer may have existing tables or new tables from other network environments and may wish to combine or merge the environments.

In some instances, the existing table groups may be outdated, necessitating the need to adapt the grouping with a new allocation. On the other hand, the current data and queries may not always be representative of the system (e.g., the network environment 100) due to, for example, unusual activity, that would lead to a new grouping used for the workload balancing of the system that is not suitable for the general use of the system.

Implementations of the current subject matter address at least these issues by integrating both kinds of information for each table to achieve a high quality result. In particular, implementations of the current subject matter provide for complementing existing table groups with regards to the results of the new allocation. This approach follows a principle in which existing table groups defined by a customer and/or application are unchanged. A group member type is introduced to classify a table as protected (e.g., belonging to a predefined/existing customer-specific/customer-designed table group). Tables with a protected group member type build predefined/existing groups, which can be complemented as described herein.

After obtaining newly calculated table groups that are formed according to a new table group allocation, a listing of new table groups is provided. The new table groups may have connections to the existing table groups. For example, if there is a table of an existing group also in a calculated group, the existing group has a connection in at least one statement/query to tables of the calculated group. In the simplest configuration, all tables of the calculated group are added to the existing one.

Implementations of the current subject matter provide an option to parameterize the tables to be added to the existing table groups. For example, not all connections in the queries have the same weight; some tables are frequently used together in several queries, while other sets of tables are used only a few times in a special-use query. Thus, the cost in terms of cross-node communication is not very high if only a few query executions are affected. On the other hand, each table has a memory footprint associated with it, thus adding a table also affects the memory balancing of the landscape. The parameterization can be utilized to identify tables with meaningful connections to an existing table group.

According to implementations of the current subject matter, a ratio for each table can be computed, with the ratio indicating if there is a significant amount of cross-table-workload. The factors involved can include query executions affecting a single table and query executions involving several tables.

Moreover, in accordance with implementations of the current subject matter, a weighting can be applied. In particular, the cumulated execution count of a table can be weighed against the overall cumulated execution count of all or a subset of queries. Thus, the workload for each table can be measured and used to aid in a determination of moving the workload with an existing table group or keeping the table ungrouped. This approach can provide for an even distribution with respect to memory across the nodes.

According to some aspects of the current subject matter, limitations may be set on the number of tables that can be added to an existing table group. A specific number can be established (e.g., no more than 10 tables) and/or a limit based on the weighting can be established. For example, only tables with a weighting value greater than a predetermined value can be added to an existing table group, with this number of tables not to exceed 10 tables.

The complementing of existing table groups, in accordance with implementations of the current subject matter, may be implemented within another process for maintaining one or more existing table groups (e.g., customer-specific/customer-designed table groups, as well as the table groups formed through a previous allocation determination) while also obtaining newly calculated table groups that are formed according to a new table group allocation. In particular, as the use of the system (e.g., the network environment 100) changes over time due to, for example, different workloads, new applications, and/or upgrades, workload balancing and/or data transfer issues need to be reconsidered. Thus, a reallocation of table groups may be necessary or desirable. That is, the table groups may need to be adapted (e.g., rearranged) to optimize workload balancing and/or data transfers for new workload patterns. However, it may be desirable to take into consideration the existing table groups when performing such a reallocation (as opposed to neglecting the existing table groups, calculating new table groups, and overwriting the existing group information). For example, manually grouped tables (e.g., those created by a customer) are likely relevant or important to the customer. Also, such manually grouped tables may still have at least some relevance to the new workload pattern.

According to implementations of the current subject matter, an allocation of table groups is provided while taking into account the existing table groups. In particular, an identification of tables that are members of an existing group is utilized to distinguish between manually grouped table groups (e.g., customer-specific/customer-designed table groups) and automatically allocated table groups (e.g., the table groups formed through a previous allocation determination). The identification may be established by setting a group type with each existing table group. According to an embodiment, the group types may include manually grouped and automatically allocated, with each group referring to types of existing table groups. With such an identification, a user (e.g., a customer) is able to select to keep the manually grouped table groups and neglect the automatically allocated table groups.

In accordance with implementations of the current subject matter, one or more desired options (e.g., user-defined grouping options) may be selected by a user/customer and may include the following: overwrite all existing group information and use only newly calculated results (e.g., for testing); keep all existing table groups (e.g., manually grouped and automatically allocated) and group only ungrouped tables; keep groups set by the customer and/or application (e.g., manually grouped) and overwrite those set by a former analysis (e.g., automatically allocated); and/or complement the existing group tables with the newly calculated results. The selection/selections may be made on a case-by-case determination by a user. Or the selection/selections may be predetermined and applied regularly. The selection/selections of the desired options may be changed when desired. The selection/selections may be completed through use of the client 130. It should be appreciated that, consistent with some implementations of the current subject matter, there are no single table groups; each table group has at least two tables.

Figure 5A:
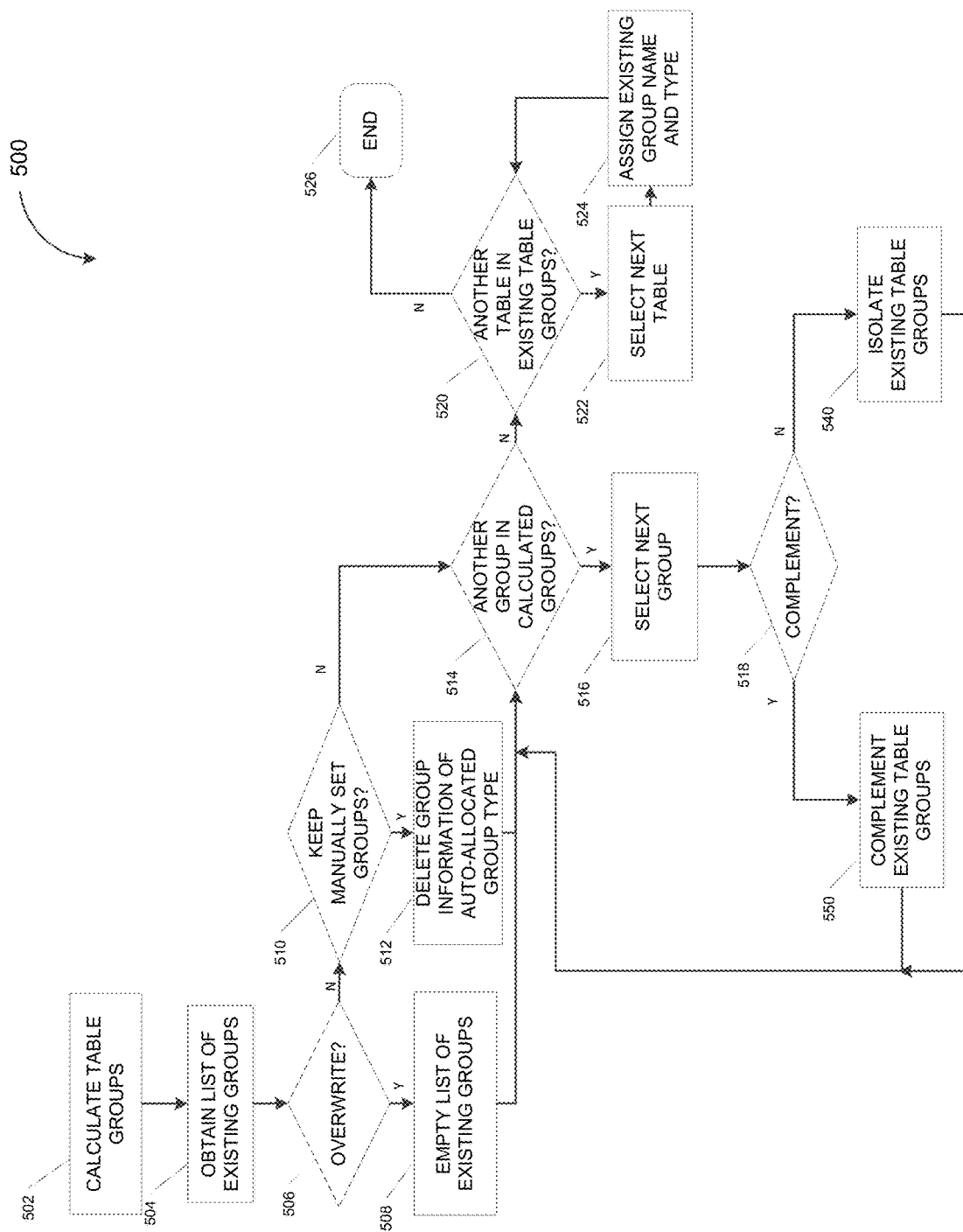
FIG. 5A depicts a flowchart illustrating a process for allocating table groups consistent with implementations of the current subject matter.

FIG. 5A depicts a flowchart illustrating a process 500 for maintaining existing table groups with newly calculated table groups and complementing existing table groups consistent with implementations of the current subject matter. The process 500 can be performed by the allocation engine 140.

The allocation engine 140 can obtain a list of calculated table groups (502). This list can be obtained by accessing the table groups resulting from the processes shown in FIGS. 4A and 4B, for example. The allocation engine 140 can obtain a list of existing table groups (504). The existing table groups can be identified by the group type identification of existing table groups. Each table in an existing table group may have a group type identification associated with it, such as manually grouped or automatically allocated.

The allocation engine 140 can determine if an overwrite mode is selected for the allocation of the table groups (506). If the overwrite mode is selected (506-Y), then the allocation engine 140 empties the list of existing table groups (deletes all group information from the list of existing groups) (508). In an overwrite situation, all existing group information is no longer of interest and/or is not desired to be taken into account in the allocation of the table groups, and only newly calculated results are used.

If, however, an overwrite mode is not selected (506-N), the allocation engine 140 determines if a mode indicating to keep only manually grouped table groups is selected (510). Such a mode serves as an indicator to delete all group information from the list of existing groups that have a group type identifying them as previously and automatically allocated. As such, upon a positive determination to keep only manually grouped table groups (510-Y), the allocation engine 140 deletes group information from the list of existing table groups with a group type that indicates automatically allocated (512). If the mode to keep only manually grouped table groups is not selected (510-N), this serves as an indicator that all existing table groups should be maintained.

Following the operations to delete, if necessary, from the list of existing table groups, some or all of the existing group information, the allocation engine 140 iteratively runs through each table from each group to determine a group name and a group type to be assigned to the respective table.

To that end, the allocation engine 140 can determine if there is another group in the list of calculated groups (514). For each remaining group in the list of calculated groups (514-Y), the next group is selected (516) and a determination is made as to whether a complement mode is selected (518). If a complement mode is selected (518-Y), then the process continues to the complement existing table groups flowchart 550 depicted in FIG. 5C. If a complement mode is not selected (518-N), then the process continues to the isolate existing table groups flowchart 540 depicted in FIG. 5B.

Figure 5B:
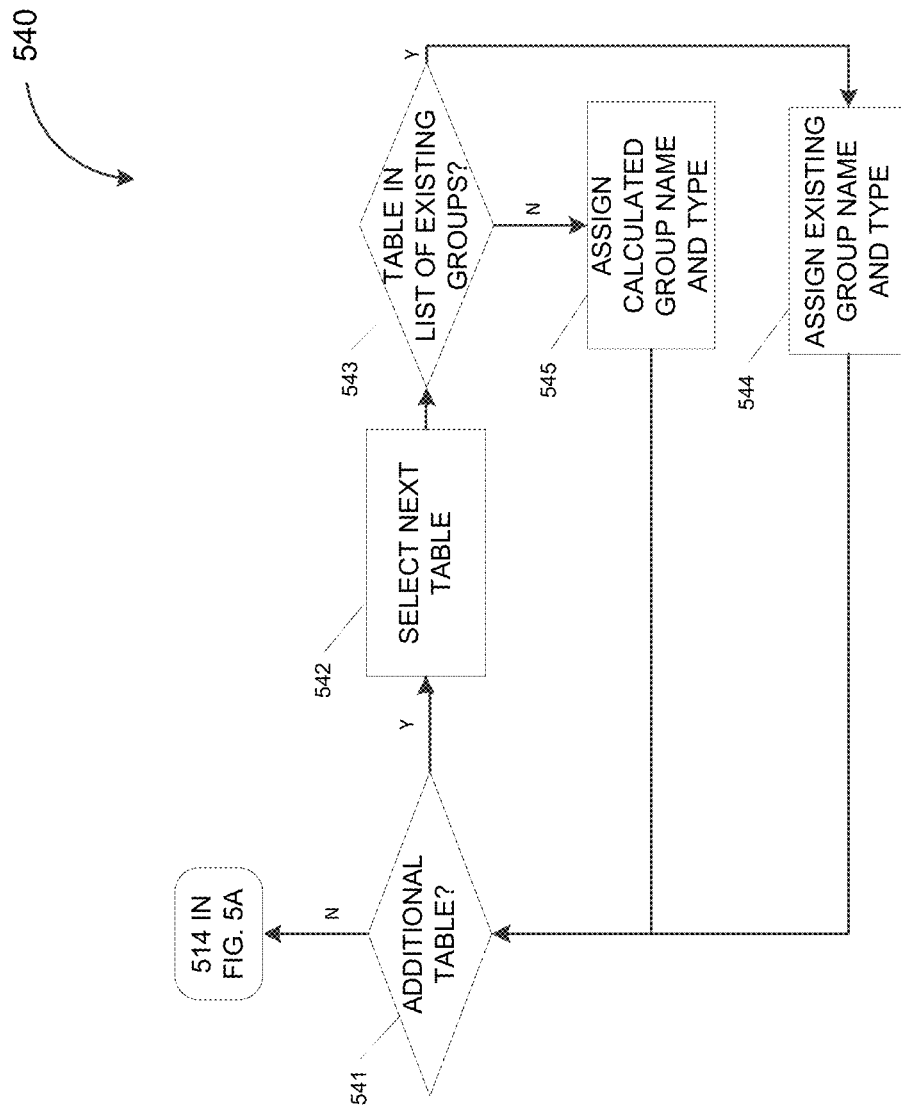
FIG. 5B depicts a flowchart illustrating a process for isolating existing table groups consistent with implementations of the current subject matter.

Now turning to the isolate existing table groups flowchart 540 depicted in FIG. 5B, a determination is made as to whether additional tables are in the group (541). If there are not additional tables in the group (541-N), the allocation engine 140 looks to the next group in the list of calculated groups (514 in FIG. 5A). However, for each additional table (541-Y), the next table from the group is selected (542) and a determination is made as to whether the table is in the list of existing groups (543). For tables in the list of existing groups (543-Y), the existing group name and group type are assigned to the respective tables (544). For tables not in the list of existing groups (543-N), the calculated group name and group type are assigned to the respective tables (545). The process iteratively repeats until there are no additional tables and no additional groups for consideration in the list of calculated groups.

Figure 5C:
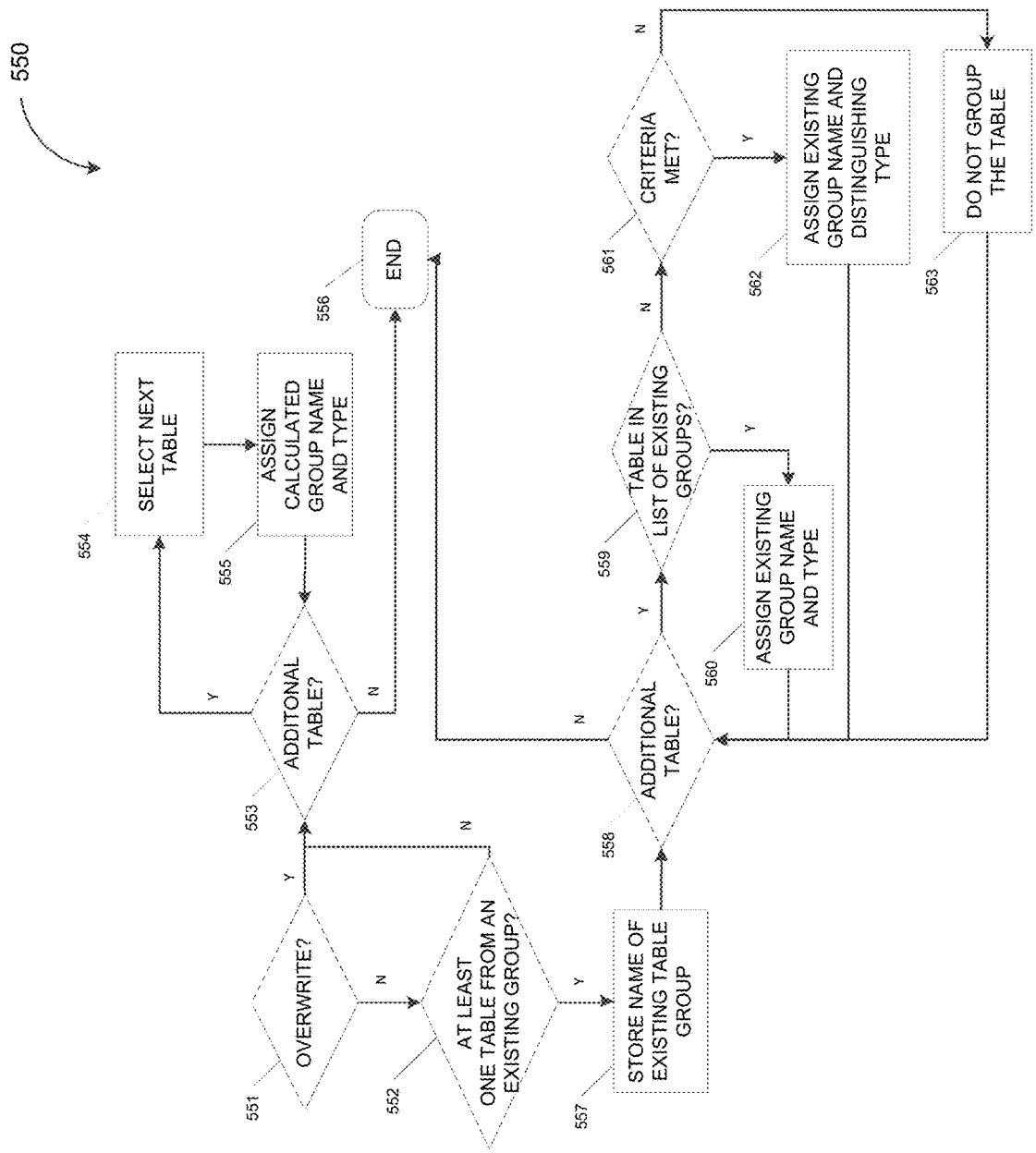
FIG. 5C depicts a flowchart illustrating a process for complementing existing table groups consistent with implementations of the current subject matter.

Now turning to the complement existing table groups flowchart 550 depicted in FIG. 5C, a determination is made as to whether an overwrite mode is selected for the allocation of the table groups (551). In an overwrite situation, all existing group information is no longer of interest and/or is not desired to be taken into account in the allocation of the table groups, and only newly calculated results are used.

If the overwrite mode is not selected (551-N), a determination is made as to whether there is at least one table from an existing table group in the calculated group (552). This is essentially a determination as to whether there is a connection between an existing table and other tables. If there is not at least one table from an existing table group in the calculated group (552-N), or if the overwrite mode is selected (551-Y), there is nothing to complement, and a determination is made as to whether there is another table in the group (553). The allocation engine 140 can select the next table from the group (554) and assign the calculated group name and group type (555). This process iteratively repeats until there are no additional tables for consideration in the list of calculated groups (556).

If there is at least one table from an existing table group in the calculated group (552-Y), this serves as an indication that the group of this table is an existing table group to be complemented. The allocation engine 140 can store the name of the existing table group in, for example, a variable (557) and can check if there is another table in the group (558). If there is not another table in the group (558-N), the complementing process, according to some implementations, ends (556) because there needs to be at least two tables in a group.

If, however, there is another table in the group (558-Y), the allocation engine 140 can determine if the table is in the list of existing table groups (559). If the table is in the list of existing table groups (559-Y), the allocation engine 140 can assign the existing group name and group type to the table (560). If, however, the table is not in the list of existing table groups (559-N), a criteria check is implemented (561). If the table fulfills configured requirements for complementing an existing table group (561-Y), then the allocation engine 140 can assign the group name of the existing table group to the table and classify it with a distinguishing group type (e.g., added) (562). According to some aspects of the current subject matter, configured (e.g., pre-established) requirements for complementing an existing table group may include, but are not limited to, memory size in given limits of a table, execution count of the table with connections to tables of the existing group, and/or workload of the table.

On the other hand, if the allocation engine 140 determines that the table does not comply with the configured requirements, the table is left ungrouped without a group name and group type (563).

Following the criteria check (561) and the subsequent assignments (562, 563), the process iteratively repeats with the remaining tables in the group (558) until no tables remain, at which point the process ends (556).

Upon completion of the isolate existing table groups (FIG. 5B) or complement existing table groups (FIG. 5C), if there is not another group in the list of calculated groups (514-N), the allocation engine 140 can determine if there is another table in the list of existing table groups (520). For each remaining table in the list of existing table groups (520-Y), the next table from the list of existing groups is selected (522) and assigned the existing group name and group type (542).

This process repeats until there are no longer any table in the list of existing table groups (520-N), at which point the process ends (526). With the process complete (534), updated table groups are formed based on the selected user-defined grouping options.

Figure 6:
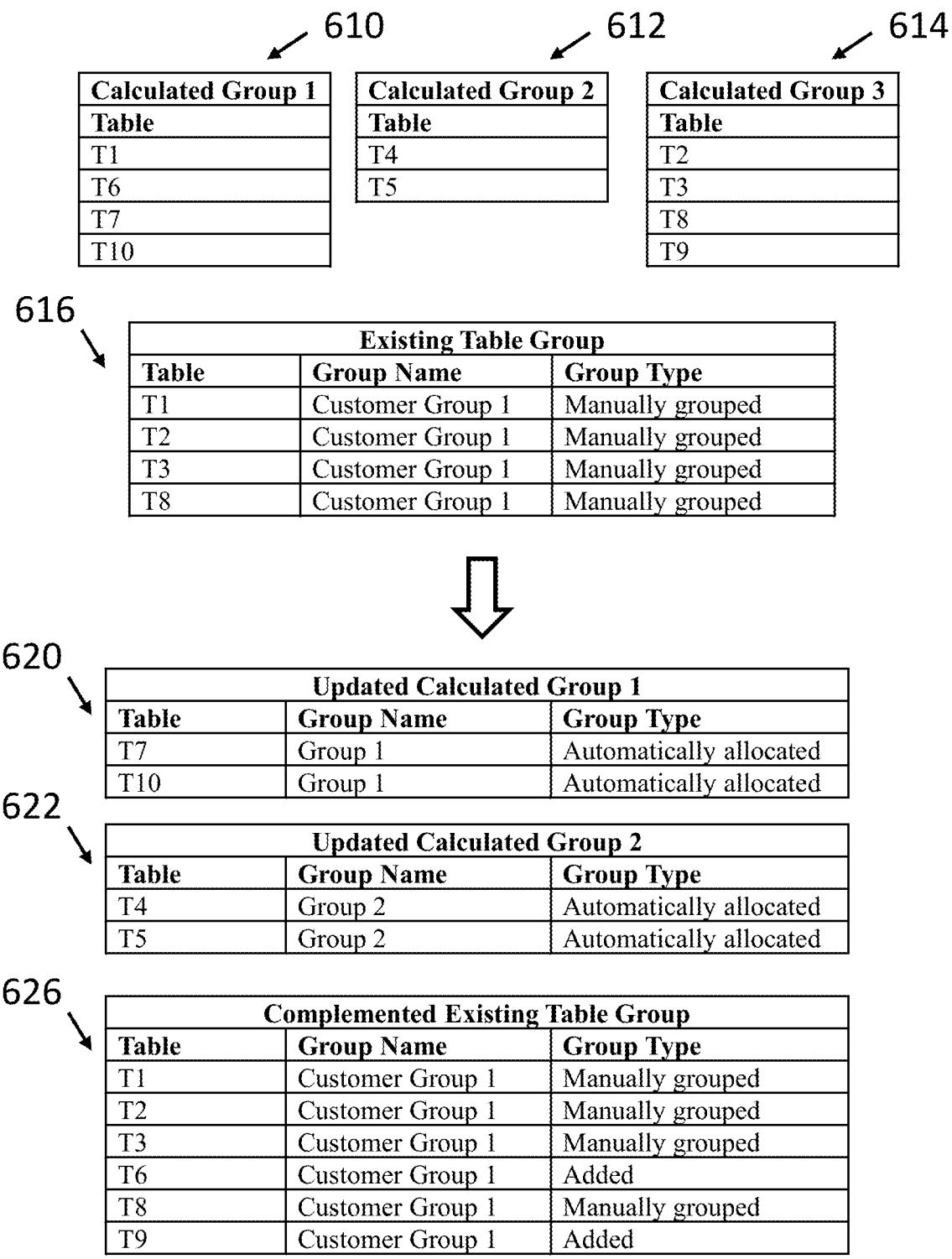
FIG. 6 depicts tables illustrating table groups consistent with implementations of the current subject matter.

FIG. 6 depicts, through a series of example tables, the processes described above with reference to FIGS. 5A-5C. In particular, FIG. 6 depicts a progression through a series of tables for the modes/user-defined grouping options in which manually grouped table groups are selected to be maintained (510-Y) and the complementing option is selected. Such modes indicate that all tables from the list of existing groups that have a group type identifying them as previously and automatically allocated are to have their group information deleted, that the manually grouped customer group tables need to be maintained, and that the manually grouped customer group tables are to be complemented with the newly calculated tables.

Calculated groups (calculated group 1-610, calculated group 2-612, and calculated group 3-614) are shown as examples and can be determined consistent with implementations of the current subject matter. An existing table groups list 616 is also shown and includes tables from a manually grouped customer group 1.

The iterative process for calculating a complemented existing table group is performed and includes, for each calculated table group that includes at least two tables and that has at least one table in the existing table group, identifying the at least one table in the existing table group. Then, for the remaining tables in the particular group, the process includes determining those that meet/comply with pre-established requirements. The tables that are in the existing table group and those that are determined to meet the pre-established requirements are assigned a group name and a group type. In particular, those tables that meet the pre-established requirements are assigned a distinguishing group type.

Calculated group 1-610 has one table that is also in the existing table group 616, namely table T1. This table is accordingly assigned the existing group name and group type and accordingly grouped. As an example, table T6 is determined to have met pre-established requirements, and is assigned the existing group name and a distinguishing group type "added". Thus, table T6 is accordingly grouped. As another example, tables T7 and T10 do not comply with the pre-established requirements, so they do not complement the existing group and remain in group 1.

With respect to calculated group 2-612, none of the tables from this group are in the existing table group 616, so these tables cannot be used to complement the existing table group 616.

With respect to calculated group 3-614, tables T2, T3, and T8 are also in the existing table group 616. Moreover, as an example, it is determined table T9 meets pre-established requirements and thus complements the existing table group 616. Table T9 is assigned the existing group name and a distinguishing group type "added". As there are no more tables in calculated group 3-614, the group is empty and does not exist after the complementing process.

The results in updated calculated group 1-620, updated calculated group 2-622, and complemented existing table group 626, are shown in FIG. 6.

The approach for complementing existing table groups with newly calculated table groups consistent with implementations of the current subject matter has wide-scale applicability for database management systems in which customized and/or previously generated tables are of interest and in which there is a need or desire to determine a new table group allocation with regards to balancing while avoiding cross-node communication, including for example, scale-out processes such as migration and/or maintenance.

The grouping approach consistent with implementations of the current subject matter may be used to prepare table distribution/redistribution in a distributed system. The information base (e.g., the set of queries used for the analysis) does not need to come from a distributed system. For example, the set of queries may be a list of queries, such as for example a list of frequently used queries, from a single node system to prepare for migration to a scale-out system.

Figure 7:
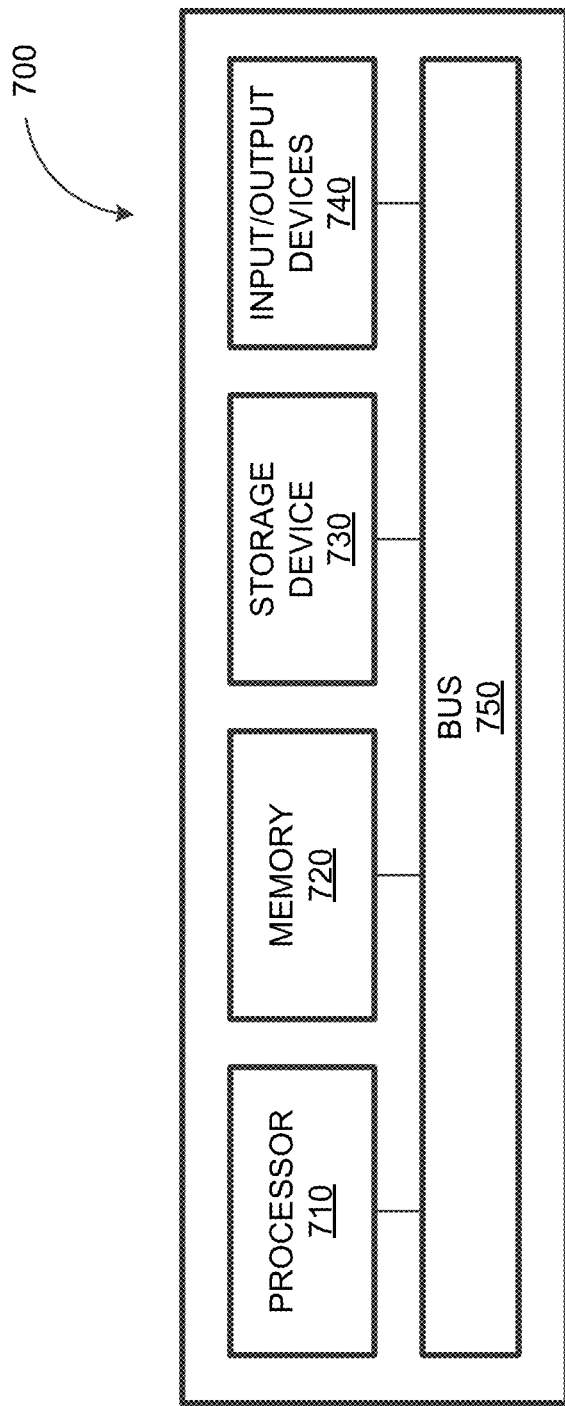
FIG. 7 depicts a block diagram illustrating a computing system consistent with implementations of the current subject matter.

FIG. 7 depicts a block diagram illustrating a computing system 700 consistent with implementations of the current subject matter. Referring to FIGS. 1 and 7, the computing system 700 can be used to implement the allocation engine 140 and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the allocation engine 140. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
   calculating, based on at least a query, a plurality of table groups, each table group comprising a grouping of tables for handling by a respective node in a distributed database;
   obtaining an existing table group, the existing table group defined separate from the plurality of table groups; and
   calculating, based on a pre-established requirement, a complemented existing table group, the pre-established requirement specifying criteria for including tables of the grouping of tables in the complemented existing table group, the complemented existing table group comprising at least the existing table group;
wherein calculating the complemented existing table group comprises:
identifying a first table group of the plurality of table groups, the first table group comprised of at least two tables and including at least one table in the existing table group;
assigning, to the at least one table, a group name of the existing table group and a group type of the existing table group;
determining, for each remaining table in the first table group, if a respective remaining table complies with the pre-established requirement;
assigning, to each remaining table in the first table group that complies with the pre-established requirement, the group name of the existing table group and a distinguishing group type, the distinguishing group type different from the group type of the existing table group; and
grouping the tables according to the respective assigned group names such that each remaining table in the first table group that does not comply with the pre-established requirement is grouped according to the calculation of the plurality of table groups.

2. The computer implemented method of claim 1, wherein each remaining table that does not comply with the pre-established requirement remains in the first table group.

3. The computer implemented method of claim 1, wherein the pre-established requirement comprises one or more values indicative of workload, cross-node communication, and/or memory.

4. The computer implemented method of claim 1, wherein determining if a respective remaining table complies with the pre-established requirement comprises:
calculating, for the respective remaining table, a weighting value, the weighting value comprising a ratio of a number of query executions for the respective remaining table over a total number of query executions for a larger subset of tables; and
comparing the weighting value to a pre-established weighting value.

5. The computer implemented method of claim 1, wherein a pre-established limit is applied for a number of tables to be added to the complemented existing table group.

6. The computer implemented method of claim 5, wherein the pre-established limit is further defined with respect to the pre-established requirement.

7. The computer implemented method of claim 1, further comprising:
assigning, in response to an overwrite command, a calculated group name and a calculated group type to each table in the plurality of table groups.

8. The computer implemented method of claim 1, further comprising:
allocating the complemented existing table group to a node in the distributed database.

9. A system, comprising:
at least one data processor; and
at least one memory storing instructions which, when executed by the at least one data processor, result in operations comprising:
calculating, based on at least a query, a plurality of table groups, each table group comprising a grouping of tables for handling by a respective node in a distributed database;
obtaining an existing table group, the existing table group defined separate from the plurality of table groups; and
calculating, based on a pre-established requirement, a complemented existing table group, the pre-established requirement specifying criteria for including tables of the grouping of tables in the complemented existing table group, the complemented existing table group comprising at least the existing table group;
wherein calculating the complemented existing table group comprises:
identifying a first table group of the plurality of table groups, the first table group comprised of at least two tables and including at least one table in the existing table group;
assigning, to the at least one table, a group name of the existing table group and a group type of the existing table group;
determining, for each remaining table in the first table group, if a respective remaining table complies with the pre-established requirement;
assigning, to each remaining table in the first table group that complies with the pre-established requirement, the group name of the existing table group and a distinguishing group type, the distinguishing group type different from the group type of the existing table group; and
grouping the tables according to the respective assigned group names such that each remaining table in the first table group that does not comply with the pre-established requirement is grouped according to the calculation of the plurality of table groups.

10. The system of claim 9, wherein each remaining table that does not comply with the pre-established requirement remains in the first table group.

11. The system of claim 9, wherein the pre-established requirement comprises one or more values indicative of workload, cross-node communication, and/or memory.

12. The system of claim 9, wherein determining if a respective remaining table complies with the pre-established requirement comprises:
calculating, for the respective remaining table, a weighting value, the weighting value comprising a ratio of a number of query executions for the respective remaining table over a total number of query executions for a larger subset of tables; and
comparing the weighting value to a pre-established weighting value.

13. The system of claim 9, wherein a pre-established limit is applied for a number of tables to be added to the complemented existing table group.

14. The system of claim 13, wherein the pre-established limit is further defined with respect to the pre-established requirement.

15. The system of claim 9, wherein the operations further comprise:
assigning, in response to an overwrite command, a calculated group name and a calculated group type to each table in the plurality of table groups.

16. A non-transitory computer-readable storage medium including program code, which when executed by at least one data processor, causes operations comprising:
calculating, based on at least a query, a plurality of table groups, each table group comprising a grouping of tables for handling by a respective node in a distributed database;
obtaining an existing table group, the existing table group defined separate from the plurality of table groups; and calculating, based on a pre-established requirement, a complemented existing table group, the pre-established requirement specifying criteria for including tables of the grouping of tables in the complemented existing table group, the complemented existing table group comprising at least the existing table group;

wherein calculating the complemented existing table group comprises:
- identifying a first table group of the plurality of table groups, the first table group comprised of at least two tables and including at least one table in the existing table group;
- assigning, to the at least one table, a group name of the existing table group and a group type of the existing table group;
- determining, for each remaining table in the first table group, if a respective remaining table complies with the pre-established requirement;
- assigning, to each remaining table in the first table group that complies with the pre-established requirement, the group name of the existing table group and a distinguishing group type, the distinguishing group type different from the group type of the existing table group; and
- grouping the tables according to the respective assigned group names such that each remaining table in the first table group that does not comply with the pre-established requirement is grouped according to the calculation of the plurality of table groups.

* * * * *